US012269257B2

(12) United States Patent
Furuyama et al.

(10) Patent No.: US 12,269,257 B2

(45) Date of Patent: Apr. 8, 2025

(54) PRINTER INCLUDING MAIN BODY CASING PROVIDED WITH RECESSED PORTION HAVING DEPTH NOT LESS THAN THICKNESS OF MEDIUM

(71) Applicant: BROTHER KOGYO KABUSHIKI KAISHA, Nagoya (JP)

(72) Inventors: Toshiyuki Furuyama, Chiryu (JP); Kiyoshi Sugimoto, Kuwana (JP); Yoshitsugu Tomomatsu, Nagoya (JP); Ryoya Takahashi, Gifu (JP); Takehiko Inaba, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 188 days.

(21) Appl. No.: 18/147,116

(22) Filed: Dec. 28, 2022

(65) Prior Publication Data

US 2023/0202205 A1 Jun. 29, 2023

(30) Foreign Application Priority Data

Dec. 28, 2021 (JP) ................................ 2021-214612

(51) Int. Cl.

*B41J 29/02* (2006.01)
*B41J 2/175* (2006.01)

(Continued)

(52) U.S. Cl.

CPC ....... *B41J 11/0045* (2013.01); *B41J 2/17513* (2013.01); *B41J 29/02* (2013.01); *B41J 29/13* (2013.01); *B41J 13/103* (2013.01); *B65H 1/04* (2013.01); *B65H 2402/442* (2013.01); *B65H 2801/12* (2013.01)

(58) Field of Classification Search

CPC .... B41J 11/0045; B41J 2/17513; B41J 29/02; B41J 29/13; B41J 13/103; B65H 2402/442; B65H 2801/12; B65H 1/04

See application file for complete search history.

(56) References Cited

U.S. PATENT DOCUMENTS

2006/0071404 A1* 4/2006 Kozaki .................... B65H 1/04 271/145

FOREIGN PATENT DOCUMENTS

JP H07-156485 A 6/1995
JP H09254477 A * 9/1997 .............. B41J 15/04

(Continued)

*Primary Examiner* — Yaovi M Ameh

(74) *Attorney, Agent, or Firm* — KENEALY VAIDYA LLP

(57) ABSTRACT

A printer includes a main body casing, a supply portion, and a recessed portion. The main body casing has a first surface, a second surface opposite the first surface, and a third surface connecting the first and second surfaces. The main body casing can be placed on a flat surface with the first surface in contact with the flat surface. The supply portion and the recessed portion are provided at the first surface. Through the supply portion, a medium is supplied into the main body casing. The recessed portion is recessed toward the second surface a depth not less than the thickness of the medium. The recessed portion extends from the third surface to the supply portion in a first direction and extends in a second direction orthogonal to the first direction. The length of the recessed portion in the second direction is greater than the width of the medium.

12 Claims, 8 Drawing Sheets

(51) Int. Cl.

| | |
|---|---|
| ***B41J 11/00*** | (2006.01) |
| ***B41J 29/13*** | (2006.01) |
| *B41J 13/10* | (2006.01) |
| *B65H 1/04* | (2006.01) |

(56) References Cited

FOREIGN PATENT DOCUMENTS

JP 2007159022 A * 6/2007 ......... G03G 21/1619
JP 2017-056704 A 3/2017

* cited by examiner

PRINTER INCLUDING MAIN BODY CASING PROVIDED WITH RECESSED PORTION HAVING DEPTH NOT LESS THAN THICKNESS OF MEDIUM

REFERENCE TO RELATED APPLICATIONS

This application claims priority from Japanese Patent Application No. 2021-214612 filed Dec. 28, 2021. The entire content of the priority application is incorporated herein by reference.

BACKGROUND ART

There has been known a conventional printer provided with a housing. The upper surface of the housing is formed with an insertion opening through which a printing medium is inserted into the inside of the printer. The user inserts the medium into the printer through the insertion opening in a state where the printer is placed on an installation surface with the lower surface of the housing in contact with the installation surface.

DESCRIPTION

However, the conventional printer is not intended to be used in a state where the printer is placed on the installation surface with the upper surface in contact with the installation surface. Therefore, the user may not smoothly supply the medium if the printer is placed in different postures.

In view of the foregoing, it is an object of the present disclosure to provide a printer enabling smooth supply of the medium thereto even if the printer is placed in different postures.

In order to attain the above and other objects, according to one aspect, the present disclosure provides a printer includes a main body casing, a supply portion, a printing unit, a discharge portion, and a recessed portion. The main body casing has a first surface, a second surface opposite the first surface, and a third surface connecting the first surface and the second surface. The main body casing is placeable on a flat surface with the first surface in contact with the flat surface. The supply portion is provided at the first surface. A medium is to be supplied to an inside of the main body casing through the supply portion. The printing unit is provided inside the main body casing. The printing unit is configured to perform printing on the medium supplied through the supply portion. The medium on which printing has been performed by the printing unit is to be discharged to an outside of the main body casing through the discharge portion. The recessed portion is provided at the first surface. The recessed portion is recessed toward the second surface by a depth that is equal to or greater than the thickness of the medium. The recessed portion extends from the third surface to the supply portion in a first direction and extends in a second direction orthogonal to the first direction. The recessed portion has a length in the second direction that is greater than the width of the medium.

In the above configuration, the medium can be supplied into the main body casing through the supply portion. Accordingly, smooth supply of the medium can be performed even if the printer (and more specifically, the main body casing) is placed in different postures.

OVERVIEW OF PRINTER 1

Figure 1:
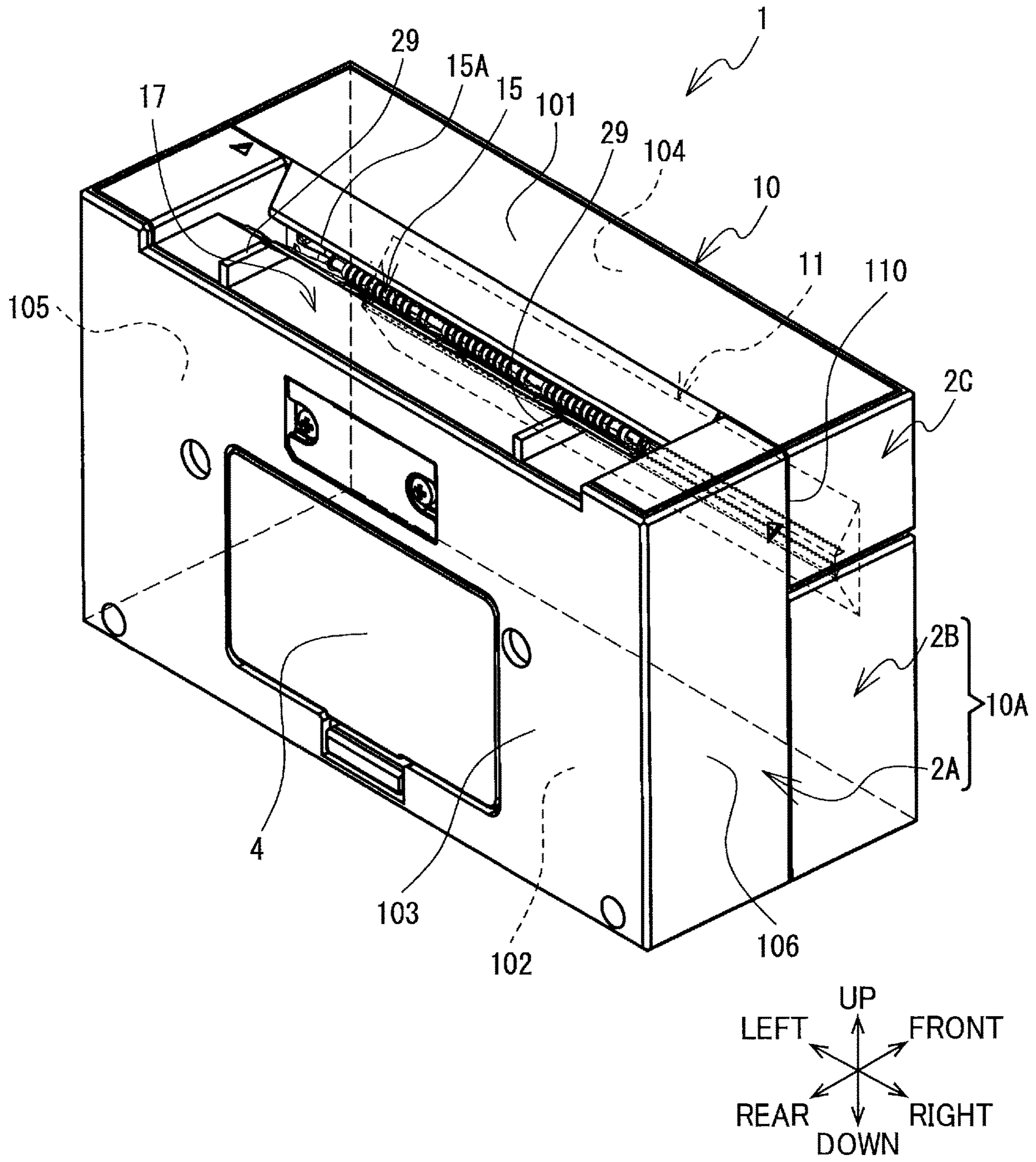
FIG. 1 is a perspective view of a printer 1 in a first posture.

Next, a printer 1 according to one embodiment of the present disclosure will be described while referring to the accompanying drawings. In the following description, “front”, “rear”, “up”, “down”, “left”, and “right” indicated by the arrows in the drawings will be defined as the frontward direction, the rearward direction, the upward direction, the downward direction, the leftward direction, and the rightward direction, respectively. For convenience of description, the directions indicated by the arrows in each drawing will be used when referring to the directions with respect to the printer 1 depicted in the drawing.

The printer 1 can be connected to an external terminal (illustration omitted) via a USB cable. “USB” is a registered trademark of the USB Implementers Forum. The external terminal is a general-purpose personal computer (PC), for example. The printer 1 can be driven by an external power supply or batteries. The printer 1 is configured to print characters, such as letters, figures, and the like, on a printing medium (hereinafter, simply referred to as the “medium M”) on the basis of print data received from the external terminal. The medium M is supplied to the printer 1 from the outside of the printer 1.

Figure 2:
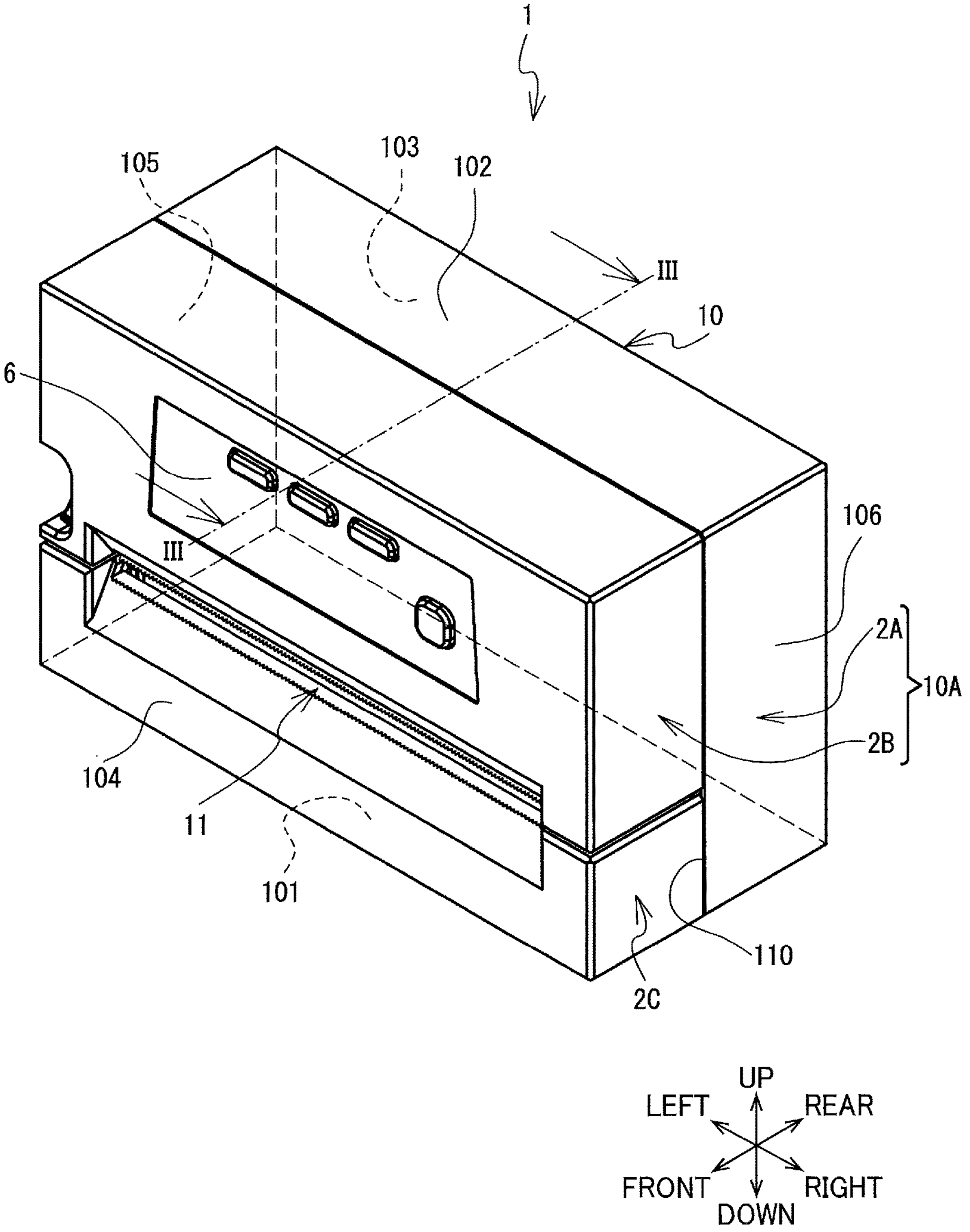
FIG. 2 is a perspective view of the printer 1 in a second posture.

The appearance of the printer 1 will be described while referring to FIGS. 1 and 2. The posture of the printer 1 shown in FIG. 1 is defined as a first posture. The posture of the printer 1 shown in FIG. 2 is defined as a second posture. The second posture is a posture obtained by turning upside down the printer 1 of the first posture.

The printer 1 includes a main body casing 10, a sheet supplying portion 15, a recessed portion 17, a printing unit 8, a platen unit 5, an operating panel 6, a sheet discharging portion 11, and a pair of guides 29.

The main body casing 10 has a substantially rectangular parallelepiped shape elongated in the left-right direction. The main body casing 10 has an upper surface 101, a lower surface 102, a rear surface 103, a front surface 104, a left surface 105 and a right surface 106. The upper surface 101 and the lower surface 102 are opposite each other. Each of the rear surface 103, the front surface 104, the left surface 105 and the right surface 106 connects the upper surface 101 and the lower surface 102. The upper surface 101 is an example of the first surface. The lower surface 102 is an example of the second surface. The rear surface 103 is an example of the third surface.

Figure 3:
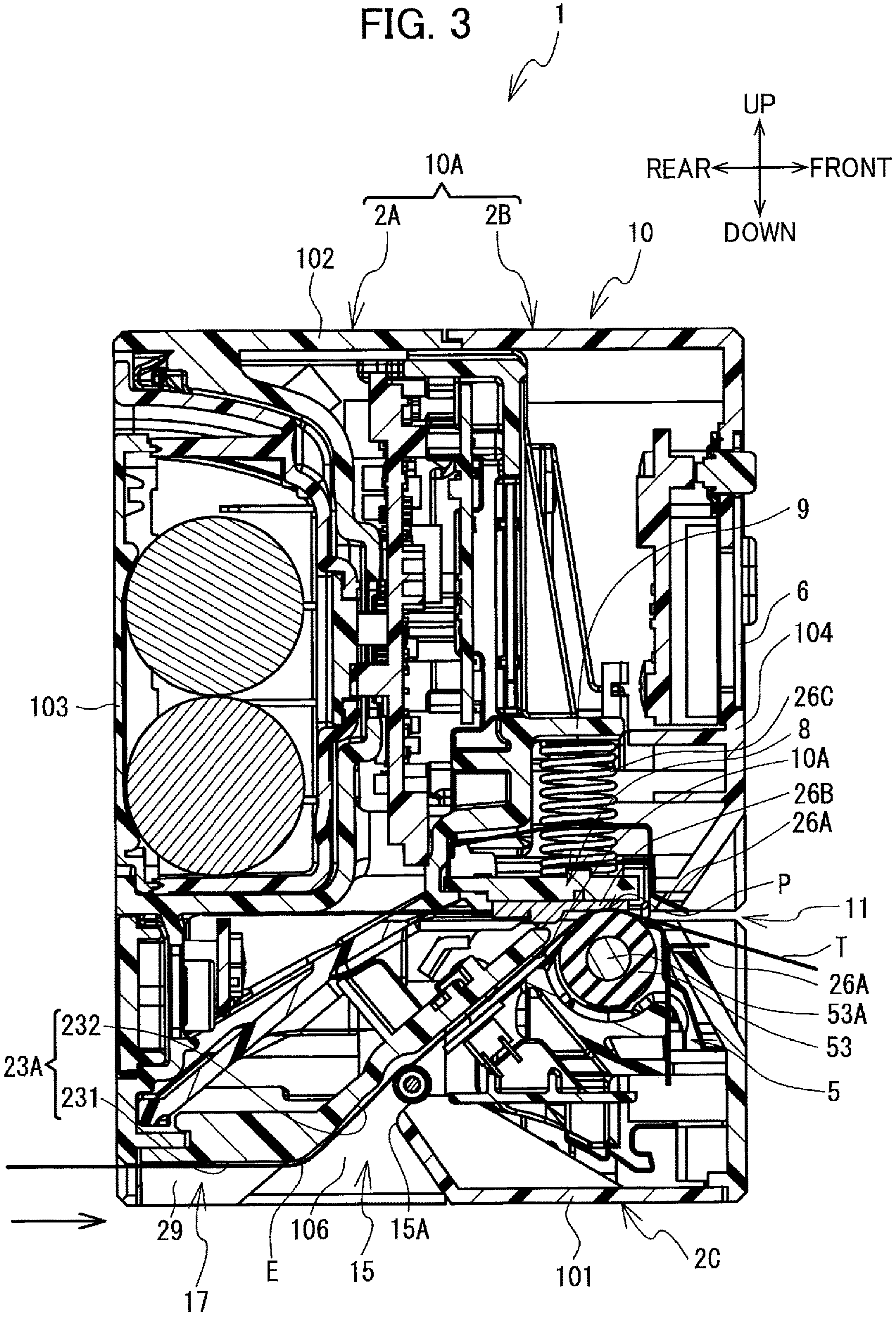
FIG. 3 is a cross-sectional view of the printer 1 taken along line III-III shown in FIG. 2.

The sheet supplying portion 15 is provided at the upper surface 101. The sheet supplying portion 15 is a portion for supplying the medium M to the inside of the main body casing 10. In other words, the sheet supplying portion 15 is a portion through which the medium M is to be supplied to the inside of the main body casing 10. A specific structure of the sheet supplying portion 15 will be described later. The printing unit 8 and the platen unit 5 are provided inside the main body casing 10 as illustrated in FIG. 3. The printing unit 8 is configured to perform printing on the medium M. The platen unit 5 is configured to convey the printing medium M. Specific structures of the printing unit 8 and platen unit 5 will be described later. The sheet supplying portion 15 is an example of the supply portion.

A battery lid 4 is provided at the rear surface 103. The battery lid 4 is a lid of a battery casing. In FIG. 2, the operating panel 6 is provided at the upper portion of the front surface 104. The operating panel 6 is configured to receive various operations performed by the user. In FIG. 2, the sheet discharging portion 11 is provided below the operating panel 6. The sheet discharging portion 11 is configured to discharge the medium M toward the outside of the main body casing 10 after the printing unit 8 has printed on the medium M. In other words, the medium M on which printing has been performed by the printing unit 8 is to be discharged to the outside of the main body casing 10 through the sheet discharging portion 11. The sheet discharging portion 11 is an example of the discharge portion.

The configuration of the printer 1 will be described in detail while referring to FIG. 1. In the following descriptions referring to FIG. 1, it is assumed that the printer 1 is in the first posture. As shown in FIG. 1, the substantially rectangular parallelepiped main body casing 10 of the printer 1 is formed by assembling a first unit 10A and a second unit 2C to each other.

The first unit 10A has a substantially L-shape in a right-side view. The first unit 10A is provided with an attachment portion 110 at the front-upper portion of the first unit 10A. The attachment portion 110 has a substantially L-shape in a right-side view. The second unit 2C has a substantially rectangular shape in a right-side view. The second unit 2C is attachable to and detachable from the attachment portion 110 of the first unit 10A. The printer 1 shown in FIG. 1 is configured of the first unit 10A and the second unit 2C attached to the attachment portion 110.

The first unit 10A includes a rear-side portion 2A and a front-side portion 2B. The rear-side portion 2A constitutes the rear portion of the first unit 10A. The rear-side portion 2A has a substantially rectangular shape elongated in the up-down direction in a right-side view. The rear-side portion 2A accommodates therein a circuit board and other components for driving the printer 1. The front-side portion 2B constitutes the front portion of the first unit 10A. The front-side portion 2B is provided at the front-lower portion of the rear-side portion 2A. The front-side portion 2B has a substantially rectangular shape elongated in the up-down direction in a right-side view. The height of the front-side portion 2B is lower than the height of the rear-side portion 2A. In other words, the dimension in the up-down direction of the front-side portion 2B is smaller than the dimension in the up-down direction of the rear-side portion 2A. The front-side portion 2B accommodates therein the printing unit 8 as illustrated in FIG. 3. The second unit 2C is positioned above the front-side portion 2B in an attached state where the second unit 2C is attached to the attachment portion 110 of the first unit 10A. The second unit 2C has a substantially rectangular shape in a right-side view. The second unit 2C accommodates therein the platen unit 5 as illustrated in FIG. 3.

The relationships between each surface of the first unit 10A, each surface of the second unit 2C, and the upper surface 101 through the right surface 106 of the main body casing 10 will be described in detail while referring to FIG. 1.

The upper surface 101 of the main body casing 10 is constituted by the upper surface of the first unit 10A and the upper surface of the second unit 2C. More specifically, the upper surface 101 is constituted by the upper surface of the rear-side portion 2A and the upper surface of the second unit 2C. The lower surface 102 of the main body casing 10 is constituted by the lower surface of the first unit 10A. More specifically, the lower surface 102 is constituted by the lower surface of the rear-side portion 2A and the lower surface of the front-side portion 2B. The rear surface 103 of the main body casing 10 is constituted by the rear surface of the first unit 10A. More specifically, the rear surface 103 is constituted by the rear surface of the rear-side portion 2A.

The front surface 104 of the main body casing 10 is constituted by the front surface of the second unit 2C and the front surface of the first unit 10A. More specifically, the front surface 104 is constituted by the front surface of the second unit 2C and the front surface of the front-side portion 2B. The left surface 105 of the main body casing 10 is constituted by the left surface of the first unit 10A and the left surface of the second unit 2C. More specifically, the left surface 105 is constituted by the left surface of the rear-side portion 2A, the left surface of the front-side portion 2B, and the left surface of the second unit 2C. The right surface 106 of the main body casing 10 is constituted by the right surface of the first unit 10A and the right surface of the second unit 2C. More specifically, the right surface 106 is constituted by the right surface of the rear-side portion 2A, the right surface of the front-side portion 2B, and the right surface of the second unit 2C.

The internal mechanisms of the printer 1 will be described while referring to FIG. 3. In the following descriptions referring to FIG. 3, it is assumed that the printer 1 is in the second posture and the second unit 2C is attached to the first unit 10A. The printing unit 8 is provided inside the main body casing 10. More specifically, the printing unit 8 is positioned at the lower end portion of the front-side portion 2B. The printing unit 8 is configured to perform printing on the medium M that has been supplied through the sheet supplying portion 15.

The printing unit 8 includes a thermal head 26B and a spring 26C. The thermal head 26B and the spring 26C are supported by a supporting member 9 provided inside the main body casing 10. The thermal head 26B is provided at the lower end portion of the front-side portion 2B. The thermal head 26B extends in the left-right direction. The thermal head 26B is configured to print characters on the medium M by heating the medium M. The lower end portion of the spring 26C is connected to the upper portion of the thermal head 26B. The upper end portion of the spring 26C is fixed in position by the supporting member 9. Thus, the thermal head 26B is urged downward by the elastic force of the spring 26C.

The platen unit 5 is provided at the second unit 2C. The platen unit 5 includes a platen roller 53 rotatably supported therein. The platen roller 53 is rotatable about a rotation axis 53A extending in the left-right direction. The platen roller 53 is in contact with the thermal head 26B from below.

The platen unit 5 further includes a motor (not illustrated). The rotational drive force of the motor is transmitted to the platen roller 53 through a plurality of gears (illustration omitted) to rotate the platen roller 53. The platen roller 53 is configured to convey the medium M nipped between the platen roller 53 and the thermal head 26B toward the downstream side of a conveying path T.

The position at which the thermal head 26B is in contact with the platen roller 53 is defined as a printing position P. At the printing position P, the medium M is nipped between the platen roller 53 and the thermal head 26B. In this state, when the thermal head 26B generates heat, characters are printed on the medium M.

The configuration of the sheet supplying portion 15 will be described in detail while referring to FIG. 1. The sheet supplying portion 15 is provided at the upper surface 101 of the main body casing 10. More specifically, the sheet supplying portion 15 is provided at the upper surface of the second unit 2C. The rear end portion of the upper surface of the second unit 2C is recessed toward the lower surface 102 to form the sheet supplying portion 15. The sheet supplying portion 15 has a length in the left-right direction greater than the length in the width direction of the medium M, i.e., the width of the medium M. In other words, the dimension of the sheet supplying portion 15 in the left-right direction is greater than the dimension of the medium M in the width direction. The width direction of the medium M is a direction the same as the left-right direction. The sheet supplying portion 15 has a sheet supply opening 15A. The sheet supply opening 15A is formed at the back (the bottom) of the recessed portion of the sheet supplying portion 15. The sheet supply opening 15A extends in the left-right direction. The medium M is inserted into the sheet supply opening 15A of the sheet supplying portion 15, whereby the medium M is supplied to the inside of the main body casing 10.

The recessed portion 17 is provided at the upper surface 101 of the main body casing 10, and more specifically at the upper surface of the rear-side portion 2A. The recessed portion 17 is recessed toward the lower surface 102. In the front-rear direction, the recessed portion 17 is recessed over a region from the rear end of the sheet supplying portion 15 to the rear surface 103. In the left-right direction, the recessed portion 17 is recessed over a region from the vicinity of the left end portion of the rear-side portion 2A to the vicinity of the right end portion of the rear-side portion 2A. The recessed portion 17 has a length in the left-right direction greater than the length in the width direction of the medium M, i.e., the width of the medium M. In other words, the dimension of the recessed portion 17 in the left-right direction is greater than the dimension of the medium M in the width direction. The recessed portion 17 has a depth greater than or equal to the thickness of the medium M. In other words, the dimension of the recessed portion 17 in the up-down direction is greater than or equal to the dimension of the medium M in the thickness direction thereof. That is, the recessed portion 17 is recessed toward the lower surface 102 by a depth greater than or equal to the thickness of the medium M, extends from the rear surface 103 to the sheet supplying portion 15 in the front-rear direction, and extends in the left-right direction to have a length in the left-right direction that is greater than the width of the medium M. The recessed portion 17 is fixed to the main body casing 10 with screws or other means. The front-rear direction is an example of the first direction. The left-right direction is an example of the second direction.

The pair of guides 29 is provided at the recessed portion 17. More specifically, the right guide of the pair of guides 29 is positioned at the right end portion of the recessed portion 17 while the left guide of the pair of guides 29 is positioned at the left end portion of the recessed portion 17. Each of the guides 29 protrudes in the opposite direction to the direction in which the recessed portion 17 is recessed. The opposite direction denotes a direction from the lower surface 102 to the upper surface 101. In other words, the opposite direction is the upward direction in FIG. 1. The length in the opposite direction of each of the guides 29 is equal to the depth of the recessed portion 17. The pair of guides 29 is configured to regulate the position of the medium M relative to the sheet supplying portion 15 in the width direction, i.e., the left-right direction.

As shown in FIG. 3, the recessed portion 17 has a guide surface 23A. The guide surface 23A is a bent surface that extends from the vicinity of the rear surface 103 toward the sheet supplying portion 15 (and more specifically the sheet supply opening 15A) and is bent in a direction toward the lower surface 102. The guide surface 23A is configured to guide the medium M toward the sheet supplying portion 15 (and more specifically the sheet supply opening 15A) from the rear surface 103 side. The guide surface 23A includes a first portion 231 and a second portion 232. The first portion 231 extends in parallel to the lower surface 102 from the vicinity of the rear surface 103 toward the sheet supplying portion 15. The first portion 231 has one end edge and the other end edge in the front-rear direction. The one end edge is closer to the sheet supplying portion 15 than the other end edge is to the sheet supplying portion 15. Hereinafter, the one end edge of the first portion will be called the "edge E". The second portion 232 is a flat surface extending from the edge E toward the sheet supplying portion 15 (more specifically the sheet supply opening 15A) and is inclined relative to the first portion 231. That is, the guide surface 23A extends from the vicinity of the rear surface 103 toward the sheet supplying portion 15 (and more specifically the sheet supply opening 15A) and is bent at the edge E in a direction toward the lower surface 102.

The configuration of the sheet discharging portion 11 will be described in detail while referring to FIG. 2. In the following description referring to FIG. 2, it is assumed that the printer 1 is in the second posture. As shown in FIG. 2, the sheet discharging portion 11 is provided over the front-lower portion of the front-side portion 2B of the first unit 10A and the front-upper portion of the second unit 2C. The sheet discharging portion 11 extends in the left-right direction from the vicinity of the left end portion of the printer 1 to the vicinity of the right end portion of the printer 1. The sheet discharging portion 11 has a length in the left-right direction greater than the length in the width direction of the medium M, i.e., the width of the medium M. In other words, the dimension of the sheet discharging portion 11 in the left-right direction is greater than the dimension of the medium M in the width direction. The sheet discharging portion 11 is recessed rearward from the front surface 104. The sheet discharging portion 11 is configured to discharge the medium M on which printing has been performed to the outside of the main body casing 10.

Two cutting blades 26A are provided on the bottom (the back) of the recessed portion in the discharging unit 11. The two cutting blades 26A are aligned in the up-down direction and extend in the left-right direction. Each of the cutting blades 26A has a length in the left-right direction greater than the length in the width direction of the medium M, i.e., the width of the medium M. In other words, the dimension of each cutting blade 26A in the left-right direction is greater than the dimension of the medium M in the width direction. With the above structure, by virtue of the cutting blades 26A, a user can cut off the portion of the medium M that has been discharged to the outside of the main body casing 10 through the sheet discharging portion 11 from the remaining portion of the medium M.

Next, a description will be made while referring to FIG. 4A of how the medium M is supplied in a state where the printer 1 is in the first posture. In this case, the printer 1 (and more specifically the main body casing 10) is placed on an installation surface 201 of a housing 200 with the lower surface 102 in contact with the installation surface 201. The installation surface 201 is a flat surface constituting the upper surface of the bottom wall of the housing 200. The printer 1 may be fixed to the housing 200 with screws or other means. The housing 200 has a box-like shape. In the front portion of the housing 200, a portion corresponding to the operating panel 6 and sheet discharging portion 11 of the printer 1 is open frontward. A medium roll R is disposed rearward of the printer 1. The medium roll R is configured of the medium M wound in a roll shape. The medium roll R is set such that its rotational axis C extends in the left-right direction. For example, the medium roll R is a roll paper.

The medium M is drawn off the upper portion of the medium roll R to be conveyed. The medium M drawn off the medium roll R is supplied from above and rear of the printer 1. The medium M is conveyed toward the sheet supplying portion 15 while passing through the guide surface 23A. After having passed through the sheet supplying portion 15, the medium M is conveyed toward the printing position P. At the printing position P, printing is executed on the medium M by the printing unit 8. The medium M that has passed through the printing position P is discharged from the sheet discharging portion 11.

Next, a description will be made while referring to FIG. 4B of how the medium M is supplied in a state where the printer 1 is in the second posture. In this case, the printer 1 (and more specifically the main body casing 10) is placed on the installation surface 201 of the housing 200 with the upper surface 101 in contact with the installation surface 201. The printer 1 may be fixed to the housing 200 with screws or other means. The medium roll R is disposed rearward of the printer 1. The medium roll R is formed of the medium M wound in a roll shape.

The medium M is drawn off the lower portion of the medium roll R to be conveyed. Since the recessed portion 17 is recessed toward the lower surface 102 to form an insertion port opening rearward at the lower end portion of the rear surface 103, the medium M can be supplied to the printer 1 through the insertion port. In other words, the medium M is supplied to the printer 1 from the rear surface 103 side through the recessed portion 17. The medium M is conveyed along the guide surface 23A toward the sheet supplying portion 15. After having passed through the sheet supplying portion 15, the medium M is conveyed toward the printing position P. At the printing position P, printing is executed on the medium M by the printing unit 8. After having passed through the printing position P, the medium M is discharged through the sheet discharging portion 11.

As described above, the recessed portion 17 is recessed toward the lower surface 102 by a depth greater than or equal to the thickness of the medium M and provided between the rear surface 103 and the sheet supplying portion 15 over a length the same as the width of the medium M.

With the above structure, the user can supply the medium M to the printer 1 through the recessed portion 17 in a state where the upper surface 101 is in contact with the installation surface 201. Therefore, smooth supply of the medium M can be performed even if the printer 1 (the main body casing 10) is placed in different postures.

The guide surface 23A of the recessed portion 17 includes the first portion 231 and second portion 232. The first portion 231 extends in parallel to the lower surface 102 from the vicinity of the rear surface 103 toward the sheet supplying portion 15. The second portion 232 extends from the edge E toward the sheet supply opening 15A and inclined relative to the first portion 231. The edge E is an end edge in the front-rear direction of the first portion 231 that is closer to the sheet supplying portion 15. That is, the guide surface 23A is a bent surface extending from the vicinity of the rear surface 103 toward the sheet supplying portion 15 (and more specifically the sheet supply opening 15A) and bending at the edge E in a direction toward the lower surface 102.

For example, in a case where a pre-cut sheet is employed as the medium M, since the pre-cut sheet is difficult to curl, the pre-cut sheet is conveyed favorably along the second portion 232 of the guide surface 23A extending linearly toward the sheet supplying portion 15. Therefore, the user can smoothly supply the medium M along the second portion 232. In this case, the guide surface 23A is effective particularly when the printer 1 (and more specifically the main body casing 10) is placed on the installation surface 201 with the lower surface 102 in contact with the installation surface 201.

For example, in a case where the medium roll R is used as the medium M, since the medium roll R tends to curl easily, the medium roll R is conveyed favorably along the guide surface 23A that is a bent surface configured of the first portion 231 and the second portion 232 inclined relative thereto. Therefore, the user can smoothly supply the medium M along the guide surface 23A. In this case, the guide surface 23A is effective particularly when the printer 1 (and more specifically the main body casing 10) is placed on the installation surface 201 with the upper surface 101 in contact with the installation surface 201.

The pair of guides 29 is provided at the recessed portion 17. Each of the guides 29 protrudes in the direction opposite to the direction in which the recessed portion 17 is recessed. The guides 29 are configured to regulate the position of the medium M in the width direction (left-right direction) relative to the sheet supplying portion 15. The pair of guides 29 enables the user to stably supply the medium M to the sheet supplying portion 15.

The lower surface 102 can be made in contact with the installation surface 201. That is, the printer 1 (and more specifically the main body casing 10) can be placed on the installation surface 201 with the lower surface 102 in contact with the installation surface 201. The lower surface 102 and the upper surface 101 are parallel to each other. In a state where the lower surface 102 is in contact with the installation surface 201, the user can supply the medium M through the sheet supplying portion 15.

The above embodiment can be further modified in various ways as follows. The various modifications described below can be combined as long as no contradictions arise. The printer 1 in the above embodiment has a substantially rectangular shape, but is not limited to this shape and any shape is available. The shape of the printer 1 may be modified as appropriate. The upper surface 101 and lower surface 102 of the main body casing 10 need not necessarily be parallel to each other as long as the printer 1 can be placed.

In the above embodiment, the printer 1 is mounted on the housing 200, but is not limited to this configuration. For example, the printer 1 may be placed on a tabletop. In this case, the medium M may be supplied from the medium roll R placed rearward of the printer 1. Suppling the medium M to the printer 1 may be performed by the user.

In the above embodiment, the housing 200 has a box-like shape, but the shape of the housing 200 is not limited to this shape. For example, the housing 200 may simply have a plate-like shape having the installation surface 201. The housing 200 may be appropriately designed according to the mode of use by the user.

Figure 4A:
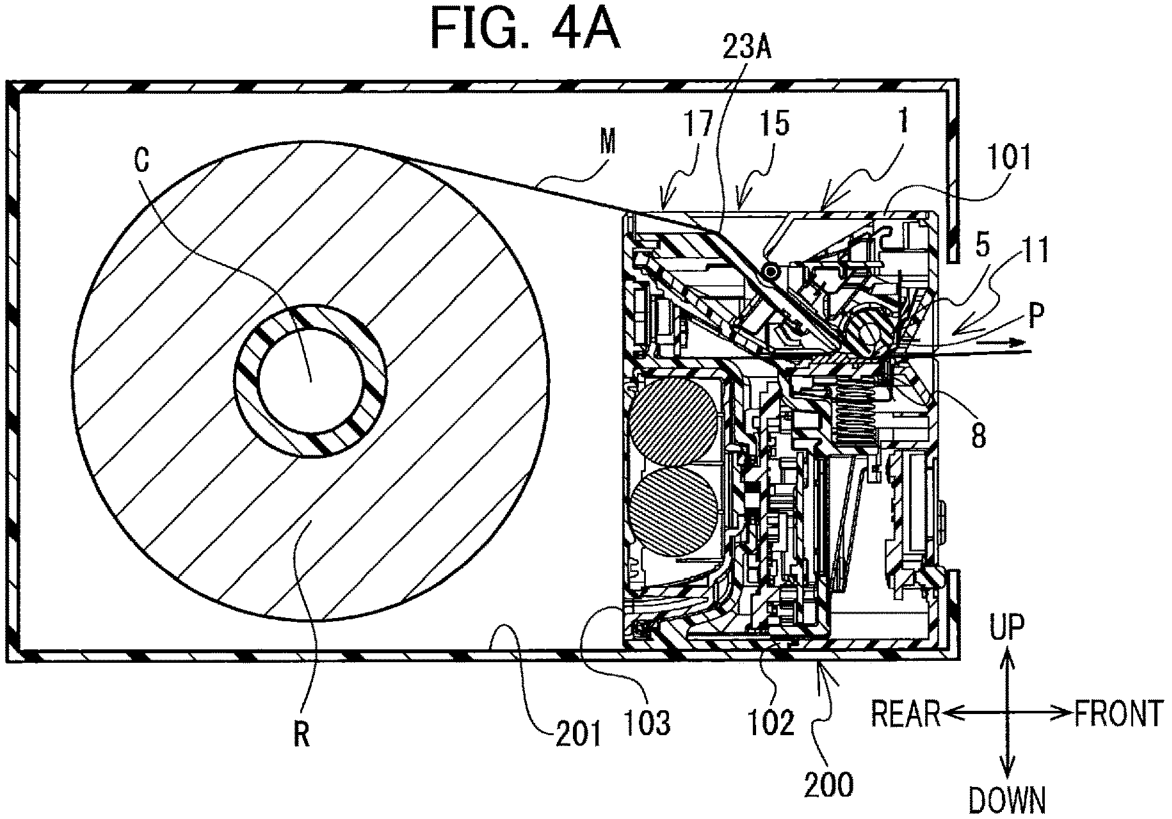
FIG. 4A is a cross-sectional view of the printer 1 in the first posture under a certain manner of use.

In the above embodiment shown in FIG. 4A, the medium M is drawn off the upper portion of the medium roll R to be supplied to the printer 1 of the first posture, but is not limited to this configuration. For example, the medium M may be drawn off the lower portion of the medium roll R to be supplied to the printer 1 of the first posture.

Figure 4B:
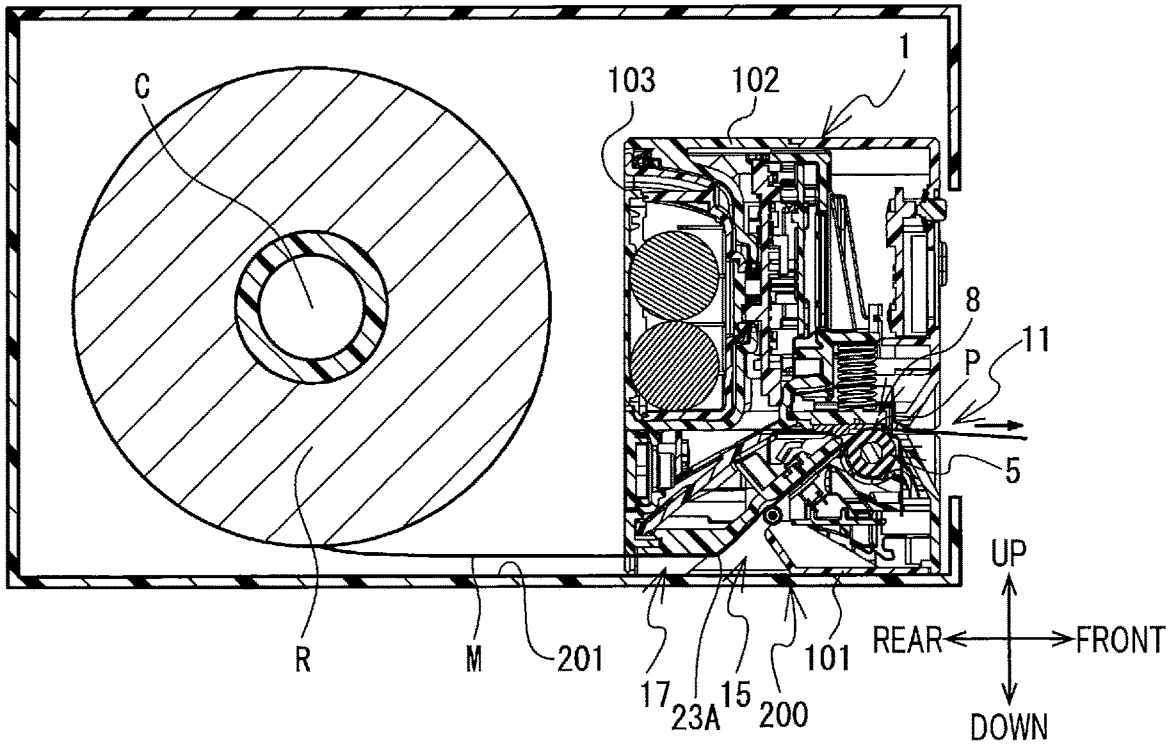
FIG. 4B is a cross-sectional view the printer 1 in the second posture under another manner of use.

In the above embodiment shown in FIG. 4B, the medium M is drawn off the lower portion of the medium roll R to be supplied to the printer 1 of the second posture, but is not limited to this configuration. For example, the medium M may be drawn off the upper portion of the medium roll R to be supplied to the printer 1 of the second posture.

In the above embodiment, the printer 1 (and more specifically the main body casing 10) is placed on the installation surface 201 with either the lower surface 102 or the upper surface 101 in contact with the installation surface 201, but is not limited to this configuration. For example, any of the rear surface 103, the front surface 104, the left surface 105 and the right surface 106 may be made in contact with the installation surface 201 when the printer 1 is placed on the installation surface 201. In this case, the positions of the sheet discharging portion 11 and the operating panel 6 may be modified as appropriate.

In the above embodiment, the sheet discharging portion 11 is provided at the front surface 104, but is not limited to this configuration. The sheet discharging portion 11 may be provided at any of the other surfaces. For example, the sheet discharging portion 11 may be provided at the rear surface 103.

Figure 5:
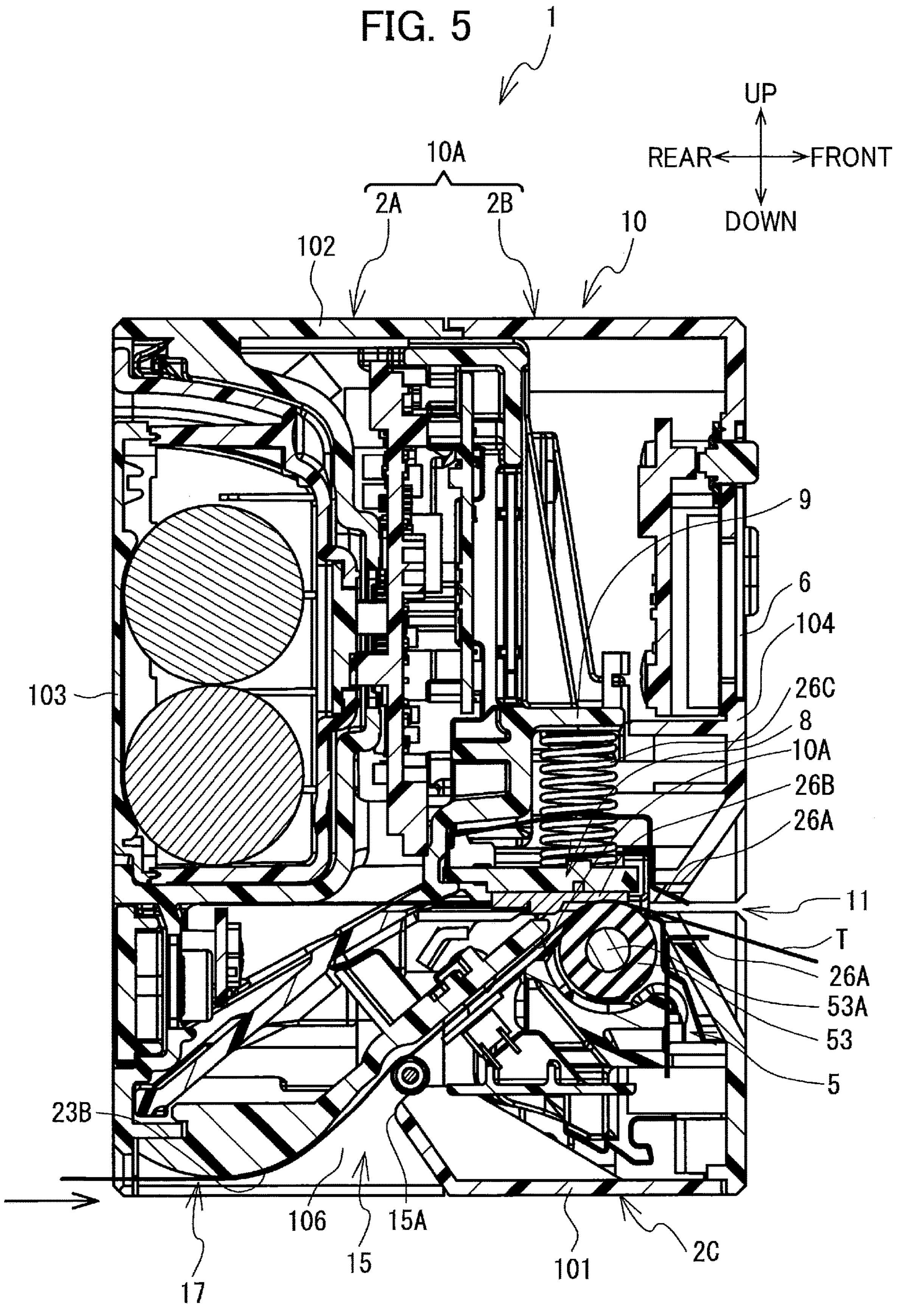
FIG. 5 is a cross-sectional view illustrating a guide surface 23B.

In the above embodiment, the guide surface 23A of the recessed portion 17 includes the first portion 231 and the second portion 232, but is not limited to this configuration. For example, in place of the guide surface 23A, the recessed portion 17 may have a guide surface 23B for guiding the medium M toward the sheet supplying portion 15 as shown in FIG. 5. The guide surface 23B is a curved surface that extends from the vicinity of the rear surface 103 toward the sheet supplying portion 15 and is curved in a direction toward the lower surface 102. For example, in a case where the medium roll R is employed as the medium M, the medium M can be smoothly supplied to the printer 1 even when the medium roll R is running low. The curved guide surface 23B is effective particularly when the printer 1 (and more specifically the main body casing 10) is placed on the installation surface 201 with the upper surface 101 in contact with the installation surface 201.

Figure 6:
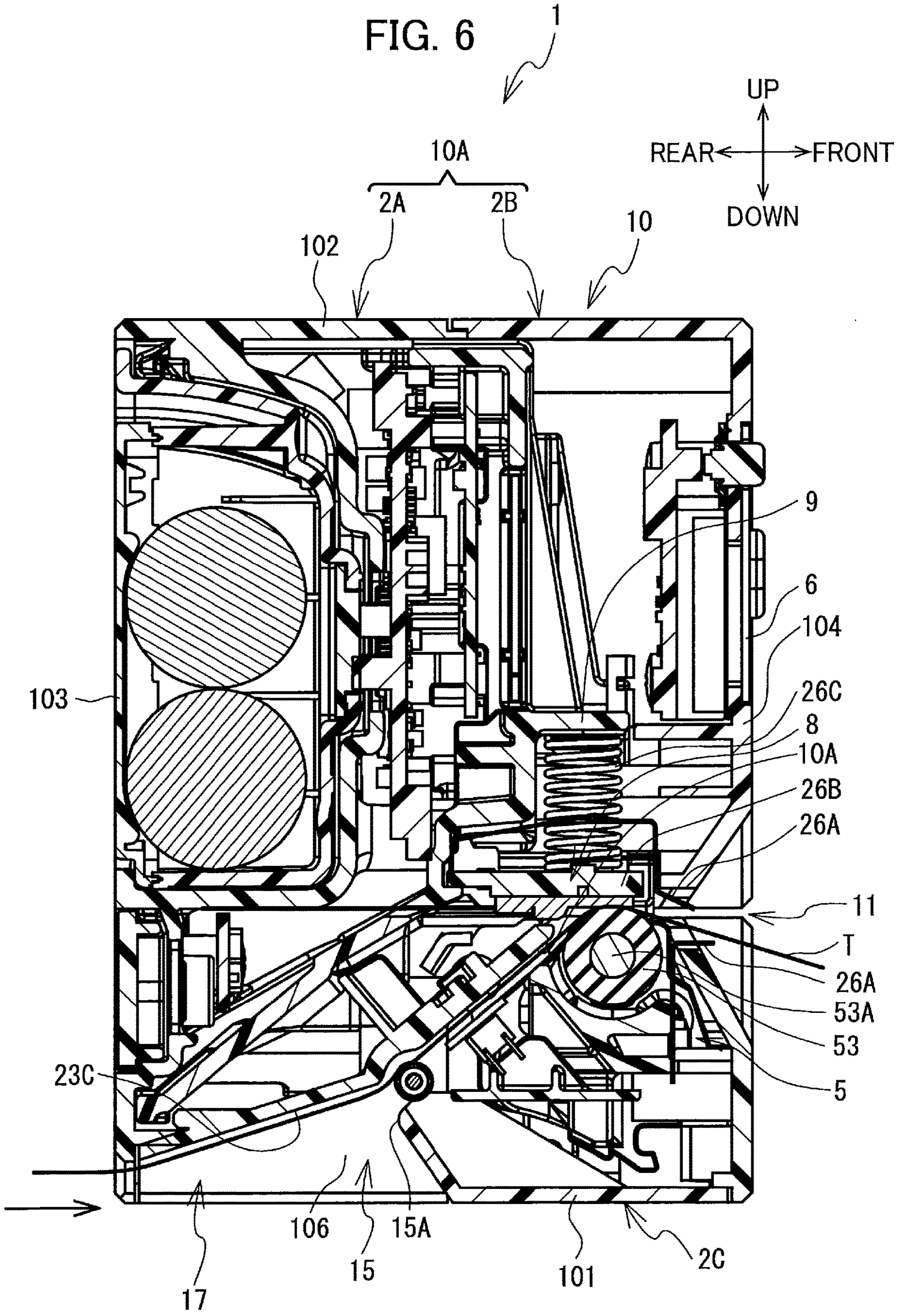
FIG. 6 is a cross-sectional view illustrating a guide surface 23C.

For example, instead of the guide surface 23A or the guide surface 23B, the recessed portion 17 may have a guide surface 23C for guiding the medium M toward the sheet supplying portion 15 as shown in FIG. 6. The guide surface 23C is a flat surface that linearly extends from the vicinity of the rear surface 103 toward the sheet supply opening 15A. For example, in a case where a pre-cut sheet is employed as the medium M, since the pre-cut sheet is difficult to curl, the pre-cut sheet is conveyed favorably along the guide surface 23C extending in a straight line. Therefore, the user can smoothly supply the medium M to the printer 1 along the guide surface 23C extending linearly. The guide surface 23C is effective particularly when the printer 1 (and more specifically the main body casing 10) is placed on the installation surface 201 with the lower surface 102 in contact with the installation surface 201.

In the above embodiment, the recessed portion 17 is fixed to the main body casing 10 with screws or other means, but is not limited to this configuration. For example, the recessed portion 17 may be fixed to the main body casing 10 with snap fits or other means. Alternatively, the recessed portion 17 may be attachable to and detachable from the main body casing 10 as illustrated in FIG. 7.

Figure 7:
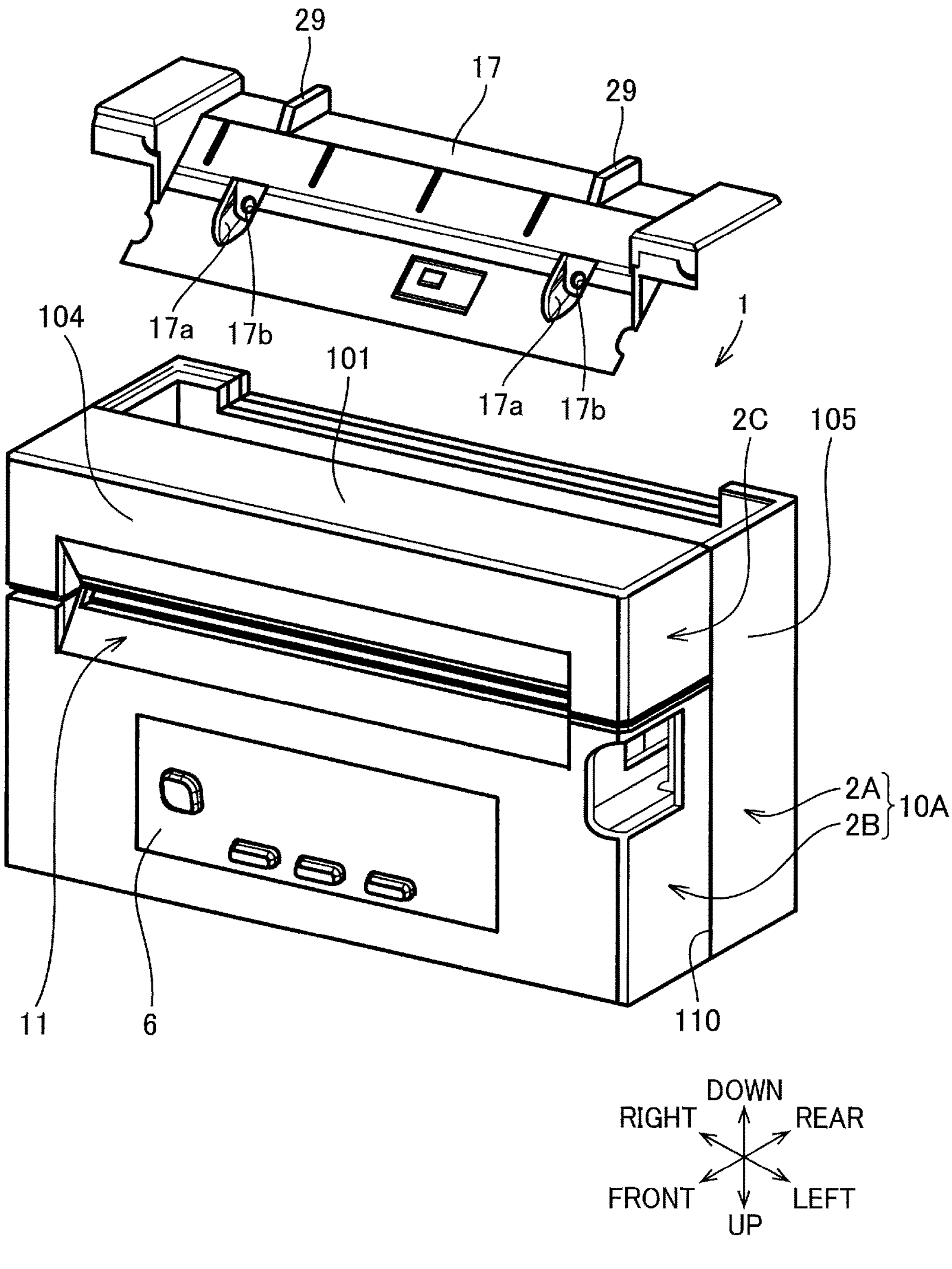
FIG. 7 is a perspective view of a printer 1 in a state where a recessed portion 17 is detached.

In the example in FIG. 7, the recessed portion 17, the rear-right portion of the upper surface 101, and the rear-left portion of the upper surface 101 are attachable to and detachable from the main body casing 10 as a single member. However, the recessed portion 17 may be attachable to and detachable from the main body casing 10 independently of other parts. In the example in FIG. 7, each of the lower-left portion and lower-right portion of the recessed portion 17 is formed with a groove 17*a* recessed rearward. The bottom of each groove 17*a* is formed with a threaded hole 17*b* penetrating the lower portion of the recessed portion 17 in the front-rear direction. Further, the rear surface 103 is formed with a through-hole (not illustrated) corresponding to each threaded hole 17*b*.

For attaching the recessed portion 17 to the main body casing 10 in the example in FIG. 7, the user aligns each threaded hole 17*b* with the corresponding through-hole formed in the rear surface 103, and then threadingly engages a fixing member such as a screw or a bolt with each threaded hole 17*b* from the rear via the corresponding through-hole, whereby the recessed portion 17 is attached to the main body casing 10.

On the other hand, for detaching the recessed portion 17 from the main body casing 10, the user releases the engagement of each fixing member with the corresponding threaded hole 17*b*, and then lifts the recessed portion 17 off the main body casing 10, whereby the recessed portion 17 is detached from the main body casing 10.

In this case, the user can attach the appropriate recessed portion 17 to the main body casing 10 for the type of the medium M. For example, the user may attach the recessed portion 17 that has the guide surface 23B or the guide surface 23C to the main body casing 10. In this way, this modification enables exchange among the recessed portions 17 of different types (e.g., among the above-described three recessed portions 17, namely, the recessed portion 17 having the guide surface 23A, the recessed portion 17 having the guide surface 23B, and the recessed portion 17 having the guide surface 23C). In addition, the manufacturer or the user can easily replace parts of the recessed portion 17.

In the above embodiment, the length that each guide 29 protrudes, i.e., the length of each guide 29 in the opposite direction is the same as the depth of the recessed portion 17, but is not limited to this configuration. The length that each guide 29 protrudes may be shorter than the depth of the recessed portion 17. In other words, each of the guides may have a length in the opposite direction that is less than the depth of the recessed portion. In this case, the pair of guides 29 can be suppressed from interfering with the installation surface 201 when the printer 1 is placed on the installation surface 201 with the upper surface 101 in contact with the installation surface 201.

Alternatively, the length that each guide 29 protrudes may be greater than the depth of the recessed portion 17. In other words, each guide 29 may have a length in the opposite direction that is greater than the depth of the recessed portion 17. In this case, since the length that each guide 29 protrudes is long, the user can stably supply the medium M to the printer 1 in a state where the printer 1 is placed on the installation surface 201 with the lower surface 102 in contact with the installation surface 201.

Figure 8:
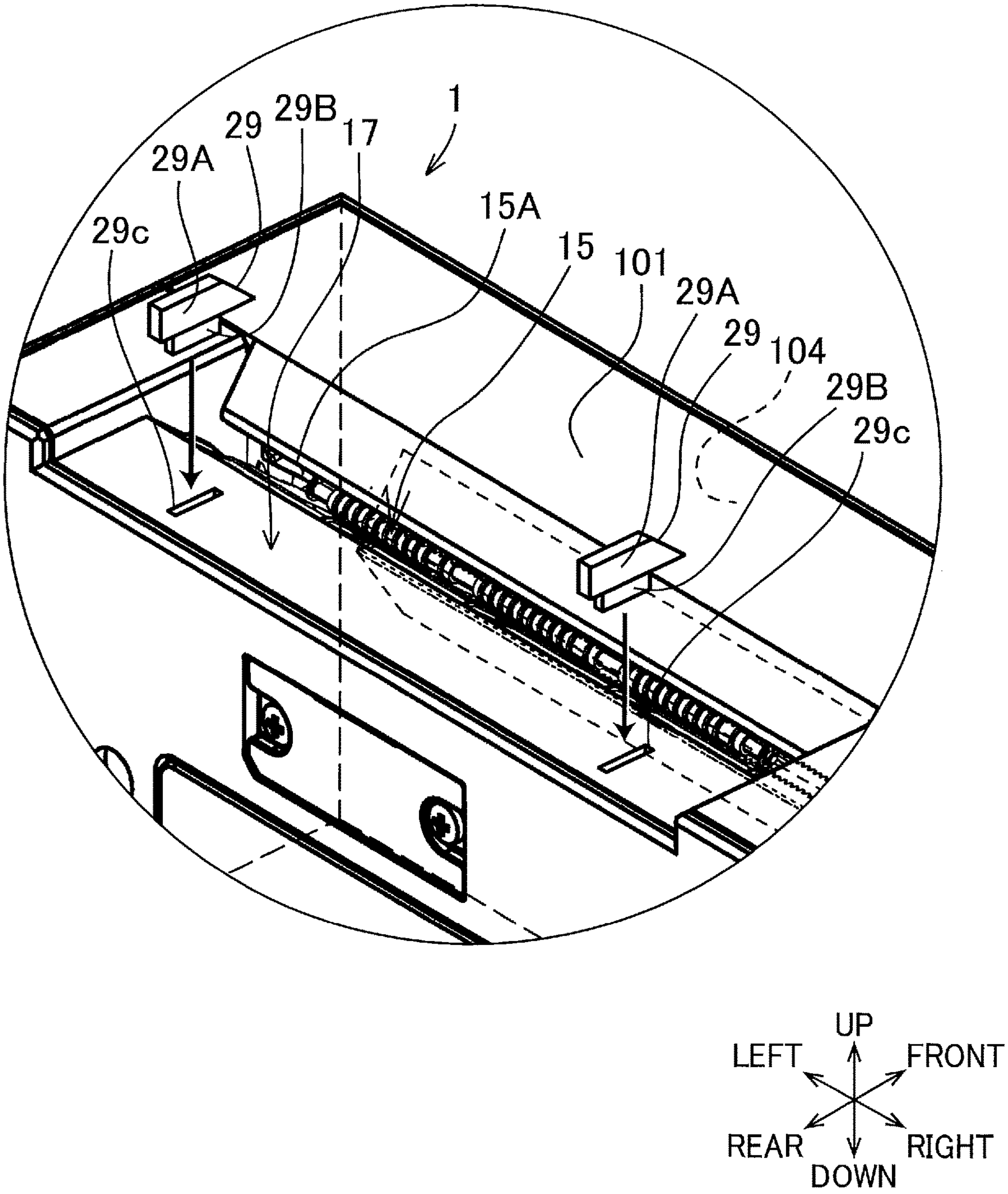
FIG. 8 is an enlarged view of the periphery of a recessed portion 17 and particularly illustrates a pair of guides 29.

In the above embodiment, each of the guides 29 is fixed to the recessed portion 17, but is not limited to this configuration. For example, each of the guides 29 may be attachable to and detachable from the recessed portion 17 as illustrated in FIG. 8. In this case, the user can attach the appropriate pair of guides 29 to the recessed portion 17 for the posture of the printer 1.

In the example in FIG. 8, each of the guides 29 includes a main body 29A and a protrusion 29B protruding from the main body 29A downward, and an insertion hole 29*c* is formed in the recessed portion 17 for each guide 29. Each insertion hole 29*c* has a shape corresponding to the protrusion 29B but slightly smaller than the same. Hence, the guide 29 can be fixed to the recessed portion 17 by insertion of the protrusion 29B into the insertion hole 29*c*.

For attaching the guide 29 to the recessed portion 17 in the example in FIG. 8, the user holds the main body 29A of the guide 29, and inserts and fits the protrusion 29B into the insertion hole 29*c,* whereby the guide 29 is attached to the recessed portion 17. On the other hand, for detaching the guide 29 from the recessed portion 17, the user holds the main body 29A of the guide 29 attached to the recessed portion 17 and pulls the guide 29 out of the recessed portion 17, whereby the guide 29 is detached from the recessed portion 17.

In the above embodiment, each of the guides 29 is fixed in its position relative to the recessed portion 17, but is not limited to this configuration. Each of the guides 29 may be movable in the left-right direction. Each of the guides 29 may be extendable and shrinkable in the up-down direction. In this case, each of the guides 29 is variable in its length (dimension) in the up-down direction. For example, when the printer 1 is in the first posture, the user can adjust and lengthen the length in the up-down direction of each of the guides 29 to a length that is longer than the depth of the recessed portion 17. When the printer 1 is in the second posture, the user can adjust and shorten the length in the up-down direction of each of the guides 29 to a length that is shorter than the depth of the recessed portion 17. Therefore, the user can adjust the length in the up-down direction of each guide 29 according to the posture of printer 1.

In the above embodiment, the second unit 2C includes a conveying mechanism for conveying the medium M using the platen roller 53. For example, in addition to the conveying mechanism, the second unit 2C may include a cutting mechanism for cutting the medium M. In a case where a medium with release paper is employed as the medium M, the second unit 2C may include a mechanism for peeling the release paper off the medium.

In the above embodiment, the second unit 2C is attachable to and detachable from the first unit 10A, but is not limited to this configuration. For example, the second unit 2C may be fixed to the first unit 10A.

In the above embodiment, the rear-side portion 2A and front-side portion 2B of the first unit 10A are configured as a single member, but are not limited to this configuration. For example, the front-side portion 2B may be formed separately from the rear-side portion 2A and attachable to and detachable from the rear-side portion 2A.

In the above embodiment, the upper surface 101 is an example of the "first surface". The lower surface 102 is an example of the "second surface". The rear surface 103 is an example of the "third surface".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printer comprising:

a main body casing having a first surface, a second surface opposite the first surface, and a third surface connecting the first surface and the second surface;

a supply portion through which a medium is to be supplied to an inside of the main body casing, the supply portion being provided at the first surface;

a printing unit provided inside the main body casing, the printing unit being configured to perform printing on the medium supplied through the supply portion;

a discharge portion through which the medium on which printing has been performed by the printing unit is to be discharged to an outside of the main body casing;

a recessed portion provided at the first surface, the recessed portion being recessed toward the second surface by a depth that is equal to or greater than the thickness of the medium, the recessed portion extending from the third surface to the supply portion in a first direction and extending in a second direction orthogonal to the first direction, the recessed portion having a length in the second direction that is greater than the width of the medium; and a platen roller configured to convey the medium, wherein the main body casing includes:

a first casing having a surface constituting at least a part of the first surface; and a second casing having a surface constituting at least a part of the first surface, the second casing being attachable to and detachable from the first casing, the second casing accommodating therein the platen roller.

2. The printer according to claim 1, wherein the recessed portion has a guide surface for guiding the medium toward the supply portion, the guide surface being a curved surface that extends toward the supply portion and is curved in a direction toward the second surface.

3. The printer according to claim 1, wherein the recessed portion has a guide surface for guiding the medium toward the supply portion, the guide surface being a flat surface that linearly extends toward the supply portion.

4. The printer according to claim 1, wherein the recessed portion has a guide surface for guiding the medium toward the supply portion, the guide surface being a bent surface that extends toward the supply portion and is bent in a direction toward the second surface, the guide surface having a first portion and a second portion, the first portion extending in parallel to the second surface toward the supply portion, the first portion having one end edge and the other end edge in the first direction, the one end edge being closer to the supply portion than the other end edge is to the supply portion, the second portion extending from the one end edge of the first portion toward the supply portion to be inclined relative to the first portion.

5. The printer according to claim 1, further comprising:

a pair of guides provided at the recessed portion and protruding in an opposite direction to a direction in which the recessed portion is recessed, the pair of guides being configured to regulate a position of the medium relative to the supply portion in the second direction.

6. The printer according to claim 5, wherein each of the guides has a length in the opposite direction that is less than the depth of the recessed portion.

7. The printer according to claim 5, wherein each of the guides has a length in the opposite direction that is greater than the depth of the recessed portion.

8. The printer according to claim 5, wherein each of the guides is attachable to and detachable from the recessed portion.

9. The printer according to claim 1, wherein the main body casing includes a battery casing having a lid, and wherein the lid of the battery casing is provided at the third surface.

10. The printer according to claim 1, further comprising:

an operating panel, wherein the main body casing further has a fourth surface opposite the third surface, the fourth surface connecting the first surface and the second surface, and wherein the operating panel is provided at the fourth surface.

11. The printer according to claim 1, wherein the printer is usable not only in a state where the main body casing is placed on a flat surface with the second surface in contact with the flat surface but also in a state where the main body casing is placed on the flat surface with the first surface in contact with the flat surface.

12. A printer comprising:

a main body casing having a first surface, a second surface opposite the first surface, and a third surface connecting the first surface and the second surface, the main body casing being placeable on a flat surface with the first surface in contact with the flat surface;

a supply portion through which a medium is to be supplied to an inside of the main body casing, the supply portion being provided at the first surface;

a printing unit provided inside the main body casing, the printing unit being configured to perform printing on the medium supplied through the supply portion;

a discharge portion through which the medium on which printing has been performed by the printing unit is to be discharged to an outside of the main body casing; and a recessed portion provided at the first surface, the recessed portion being recessed toward the second surface by a depth that is equal to or greater than the thickness of the medium, the recessed portion extending from the third surface to the supply portion in a first direction and extending in a second direction orthogonal to the first direction, the recessed portion having a length in the second direction that is greater than the width of the medium, wherein the recessed portion is attachable to and detachable from the main body casing.

* * * * *